United States Patent
Murrell et al.

[11] Patent Number: 5,339,094
[45] Date of Patent: Aug. 16, 1994

[54] VDU LINE MARKER

[76] Inventors: Nicholas J. Murrell; Joyce A. Murrell, both of 9, Haston Crescent, Kinnoull, Perth, Scotland, PH2 7XD

[21] Appl. No.: 812,816

[22] Filed: Dec. 24, 1991

Related U.S. Application Data

[63] Continuation of Ser. No. 460,883, Mar. 5, 1990, abandoned.

[51] Int. Cl.⁵ .............................................. G09G 3/02
[52] U.S. Cl. .................................... 345/157; 345/156
[58] Field of Search ............... 340/709, 706, 703, 721, 340/723, 814; 345/157, 156, 158, 160, 161, 162, 163, 167, 168, 169, 184, 145, 146, 213

[56] References Cited

U.S. PATENT DOCUMENTS

| | | | |
|---|---|---|---|
| 4,354,185 | 10/1982 | Worborchil | 340/709 |
| 4,566,000 | 1/1986 | Goldman et al. | 340/709 |
| 4,668,947 | 5/1987 | Clarke et al. | 340/703 |
| 4,751,504 | 6/1988 | Slavin | 340/709 |
| 4,782,335 | 11/1988 | Gussin | 340/703 |
| 4,870,389 | 9/1989 | Ishiwata et al. | 340/709 |

FOREIGN PATENT DOCUMENTS

| | | | |
|---|---|---|---|
| 1200631 | 2/1986 | Canada | 375/22 |
| 0009390 | 9/1979 | European Pat. Off. | |
| 0146657 | 12/1983 | European Pat. Off. | |
| 0149780 | 12/1984 | European Pat. Off. | |
| 0183246 | 11/1985 | European Pat. Off. | |
| 8702814 | 10/1986 | World Int. Prop. O. | |

*Primary Examiner*—Ulysses Weldon
*Assistant Examiner*—Xiao M. Wu
*Attorney, Agent, or Firm*—Henry M. Bissell

[57] ABSTRACT

A VDU line marker enables a specific line on a Visual Display Unit to be quickly and accurately located, similar to using a straight edge and/or a marker pen on paper. The line may be scrolled over the displayed information or the displayed information may be scrolled with the line stationary. A VDU electronic line marker is coupled between the Visual Display Unit and a computer/terminal combination and works independently of the software. It offers a choice of line color, line thickness and precise line position without using costly memory, memory controls, software, menus or multi-function use of keys and it derives its timing from the host computer.

14 Claims, 4 Drawing Sheets

VDU LINE MARKER

This is a continuation, of application Ser. No. 07/460,883, filed Mar. 5, 1990, now abandoned.

This invention relates to an electronic line marker for highlighting lines on a visual display unit (VDU).

When a substantial amount of information is displayed on a VDU it can be very difficult to locate a specific line or point on the display. A visible line marker on the VDU, which is movable independently of the displayed information, overcomes this problem in the same way as a straight edge, ruler, or marker pen is used on paper for easy location of a place in tables, printing etc.

Visible line markers are provided on some computer systems but they are somewhat complex, require a large amount of additional memory, highly stable timing circuits and a dedicated piece of software to control them. For these reasons they are expensive and are only provided on more complex computer systems or computer controlled instruments such as Nicolet, Tectronix, Hewlett Packard Oscilloscopes.

The software which is required has to move the line independently of the displayed information. To do this it needs to be able to address each pixel and its attributes individually. Consequently about ¼ of a megabyte of additional display memory is needed for a display with 720×350 pixel resolution.

It is also necessary to provide dedicated keys to control the line functions such as colour selection, line positioning in fast and normal line scrolling modes, line thickness and line on/off. In a PC (Personal Computer) system, for example, there may not be any keys available for these functions.

If the line marker can only move a pixel at a time then with a normal display it would only be possible to move the line marker by about 12 steps a second if it is to be stopped and accurately positioned in the correct place. For example with a display 350 pixels deep it would take nearly half a minute to scan the line from top to bottom of the screen.

To achieve an acceptable speed of movement requires a step speed greater than the refresh period of the display and this will result in the line marker Jumping over pixels.

Another problem encountered in line marker systems is that not all displays start from the same datum pixel and character lines may be offset from a predetermined line marker datum.

According to the present invention there is provided apparatus for electronically generating a movable line marker on a visual display unit (VDU) characterised by circuit means having input means coupled to a first source of video signals, and output means coupled to the visual display unit, the arrangement being such that the circuit means generates a line marker and combines it with the video signal for display on the VDU.

The invention is now described in more detail by way of example with reference to the drawings in which.

The invention described herein requires no memory, no memory control, no software and derives its stable timing from the host computer/terminal. It has a separate keyboard or keys which may be included in the computer/terminal keyboard, overcoming the problem of allocating keys to perform line functions. The separate keyboard also has the advantage that it may be positioned on either side of the main computer-terminal keyboard and in precisely the optimum position. Thus once the VDU electronic movable line marker is fitted it is always ready for instant operation eliminating the need to install, link or run special software or operate a software menu selection to select the line key functions.

Figure 1:
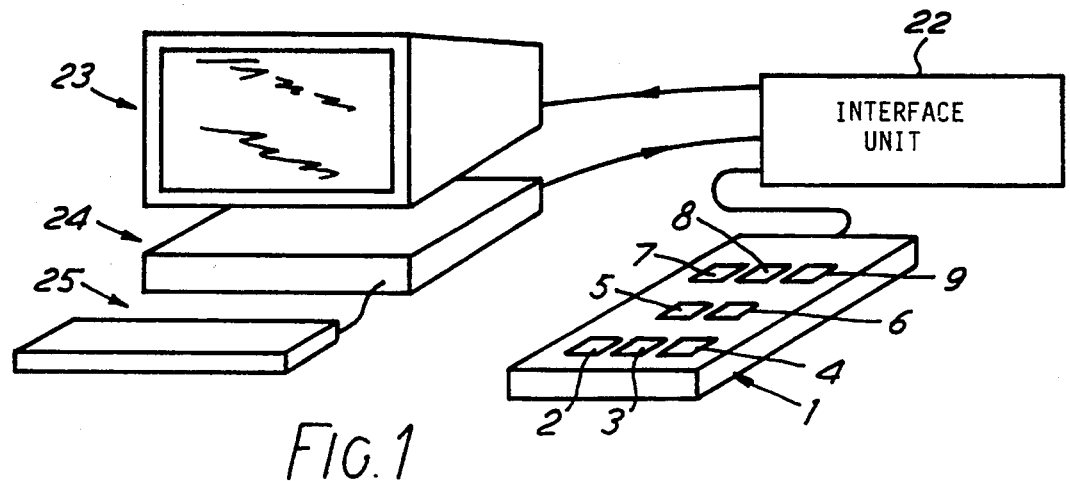
FIG. 1 shows schematically how an embodiment of the invention is attached to a computer system.

The schematic diagram of FIG. 1 shows a line marker keyboard 1 including eight keys. Two position keys 2 and 4 move the line marker up and down respectively and a fast/slow key 3 increases the speed of movement of the line marker. A line thickness key 5 lets the user choose between a thick highlighting line or an underline mode of operation. An on/off key 6 enables the user to selectively turn the line marker on or off as required. Three line colour keys 7,8 and 9 (which provide signals which generate Red, Green and Blue video signals respectively) enable a total of 8 colours from black through to white to be generated by depressing different keys or combinations of keys or no keys at all.

The keyboard 1 is coupled to an interface unit 22 which includes the hardware needed to implement the various line functions as selected on the keyboard. The interface unit 22 may be housed in a spare card slot in a computer 24 or it may be provided integrally with the keyboard or separately. The unit 22 is electrically connected between the video output of the computer 24 and video input of a VDU 23.

The circuitry needed to implement the line functions described with reference to keyboard 1 of FIG. 1 is shown in the block diagram of FIG. 2.

The digital video input to the interface unit 22 comprises a vertical synchronising signal (Vs-in), a horizontal synchronising signal (Hs-in), a video signal (Vo-in) and a contrast signal (C-in). The video output from the unit 22 has corresponding signals Vs-out, Hs-out, Vo-out and C-out. There are direct electrical connections from Vs-in to Vs-out and from Hs-in to Hs-out, or connections may be made through a buffer.

The position and thickness of a line on the screen of the VDU is manually controlled by keys 2, 3 and 4 on the keyboard 1 and the signals Vs-in and Hs-in from the video input. These all form the inputs to a counting and comparison circuit 27 on the interface unit 22.

Vs-in is the input to counter 10. The output of counter 10 and Hs-in are the two inputs to an OR gate 11. The output of gate 11 is coupled to the input to a second counter 12 and also to one of the inputs to AND gate 16. A preset output from counter 12 is one of the inputs to an OR gate 18 and the other input to this gate is the output of the thick line key 5. The output of gate 18 is the second input to gate 16 and the output of gate 16 is one of the inputs to an AND gate 17.

A second output from the counter 12 is the input to another counter 13 and the output of this is one of the inputs to a comparator 14. The comparator 14 has two further inputs. One of these inputs is from the line on/off key 6 and this determines whether or not a signal is output by the comparator. The other input to the comparator comes from a counter 15. The counter 15 is controlled by signals generated by the line position keys 2 and 3 and the fast key 4 to adjust the output of the counter 15. The output of the comparator 14 is coupled to the second input of the AND gate 17. The output of the gate 17 is the output of the counting and comparison circuit 26 and is coupled to one of the inputs to a video line combiner 19 and also to one of the inputs to a contrast control unit 20. The video line combiner 19 has two further inputs. One of these receives signals from the colour control keys 7, 8 and 9 to determine what colour of line marker should be generated.

The Vo-in signal comes through either a colour or monochrome input and passes through a switch 21 before being coupled to the remaining input of the video line combiner. The contrast signal C-in is the input to the contrast control unit 20 which also receives the video input V-in for highlighting or for cases where the contrast signal is contained in the video signal. The output of the contrast control unit 20 is the contrast output signal C-out.

In operation, counter 10 is preset to turn on the gate 11 at the top start position of the first line of text. Gate 11 controls the Hsync (Hs-in) pulses to counter 12 which counts the number of vertical pixels and is set to output a signal every complete line of text to the line counter 13. The output of the line counter 13 is compared in the comparator 14 with the keyboard (2,3 and 4) controlled up/down position line counter 15. If the outputs from the two line counters 13 and 15 match in the comparator 14 and the line on/off key 6 is ON then the comparator outputs a signal for the duration of one line.

This signal is fed into gate 17 together with the line length and thickness signal from gate 16. The line length is controlled by the Hsync (Hs-in) signal and the line thickness signal is derived from gate 18. If the thick/thin line key 5 which produces a thick line is ON a continuous signal is present at gate 18 output. If the line thickness key 5 is OFF an output from gate 18 is only present at the preset thin line position from counter 12.

The line marker "ON" signal from gate 17 is fed to the video line combiner circuit 19 which integrates (combines) the line colour selected signal from the keyboard keys 7, 8 and 9 and video signals (Vo-in) under the control of the line marker ON signal. The resultant signal is then put out to the VDU display via (Vo-out).

The line marker "ON" signal is also supplied to the contrast control 20 which automatically produces a signal if both a video (Vo-in) and line marker on signal are present. So that the line and displayed information are clearly distinguishable, the signal from the contrast control 20 is put out to (C-out) which controls either the contrast or the intensity of the display.

If the video signal (Vo-in) contains the contrast signal (C-in) then the combiner 19 and contrast control 20 are combined. If a contrast (C-in) signal is not available the combiner 19 may be fitted with an inverter so that when a line signal is present the video (Vo-out) signal is inverted so that the line and normal display information can be easily distinguished.

The line marker position keys 2 and 4 control an associated pulse generator circuit which supplies pulses to the up/down line marker counter 15. The key 3 is a fast key which is operated in conjunction with either the up key 2 or down key 4 enabling a high pulse rate and fast scrolling of the marker line.

Figure 2:
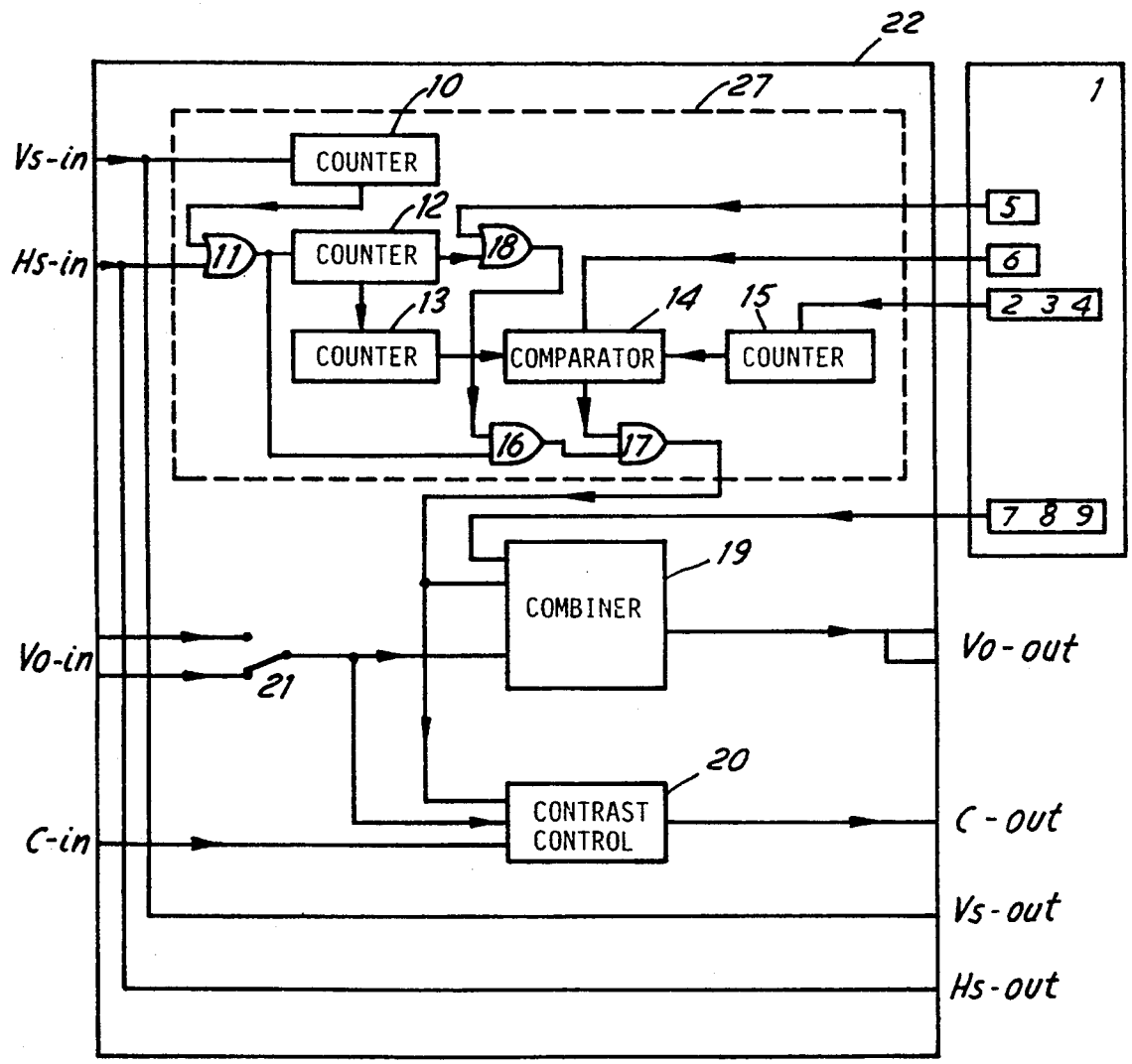
FIG. 2 is a block circuit diagram of a first embodiment of the invention showing how line marker signals are generated and inserted into the video signals for display on the VDU.

The counter 10 and counters 12 and 13 are reset every VDU frame scan by the Vsync (Vs-in) pulse, the control lines of which, for clarity, have been omitted from FIG. 2.

The electronic interface card/unit 22 may be fitted with an optional hard or software switch 21 to select colour or monochrome signal and to adjust counter 10, pixel counter 12, Vsync/Hsync signal polarity and line counters 13 and 15. Again, for clarity, the control lines have been omitted from FIG. 2.

Figure 3:
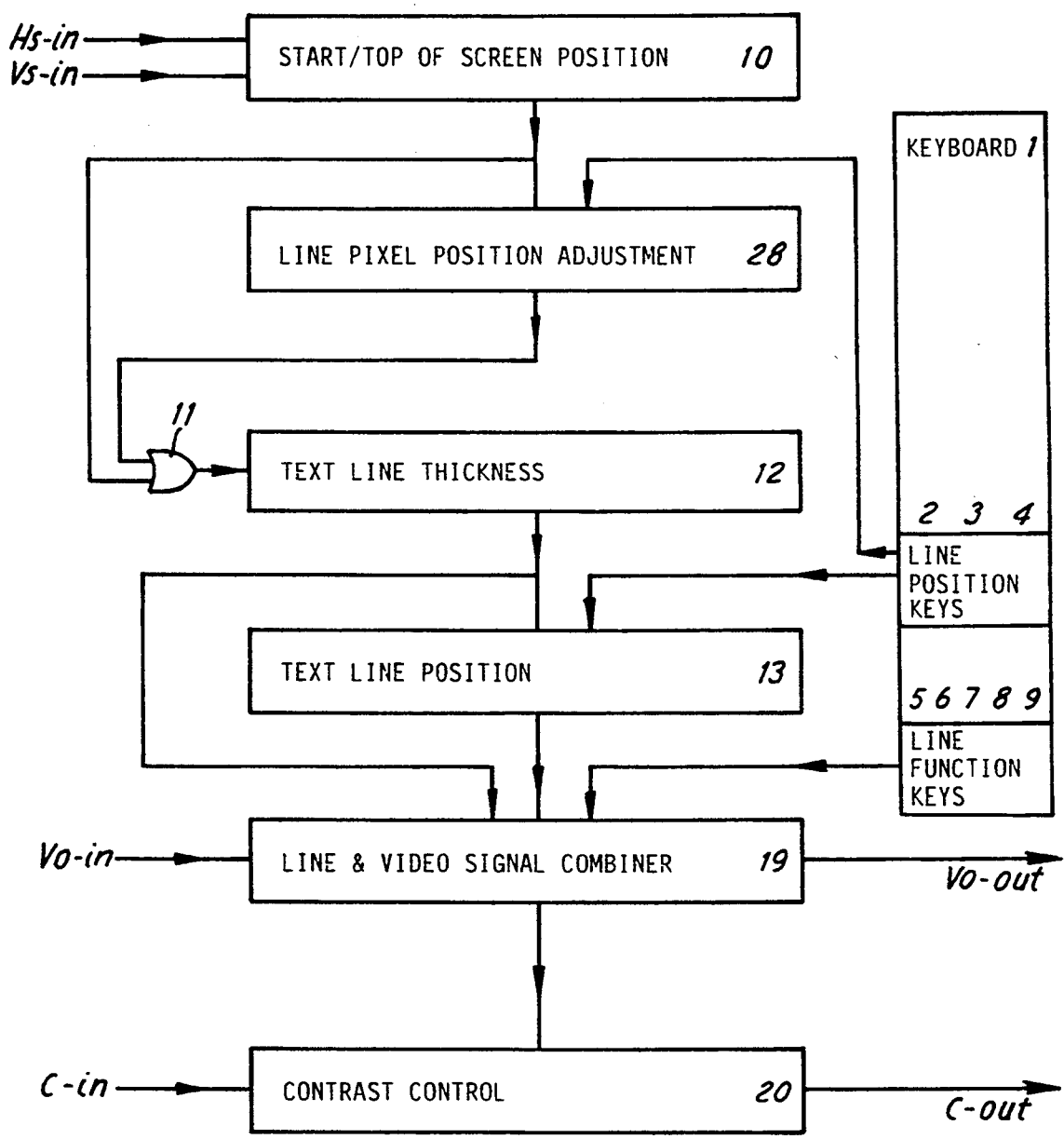
FIG. 3 shows a block diagram of a second embodiment of the invention.

A second embodiment of the invention is shown in the block diagram of FIG. 3. A start top of screen position block 10 receives horizontal and vertical sync. signals from an input video signal and determines the start position of a first line of text for example. The start signal from this block 10 is the input to a line/pixel position adjustment block 26 and also to an OR gate 11 the other input of which receives the pixel position output of the block 26. Block 26 also has an input from the line position keys 2,3,4.

The output of gate 11 is coupled to the input of a text line thickness block 12 whose output is coupled to the input of a text line position block 13 which also has an input from the line position keys 2,3,4. The output of block 13 is coupled to an input of a line and video signal combiner 19. The other inputs to the combiner 19 are, the video signal, Vo-in and signals from the line function keys 5,6,7,8,9.

The combiner has two outputs, one for the video output signal Vo-out and one forming an input to a contrast control circuit 20 which has a contrast input C-out.

Figure 4:
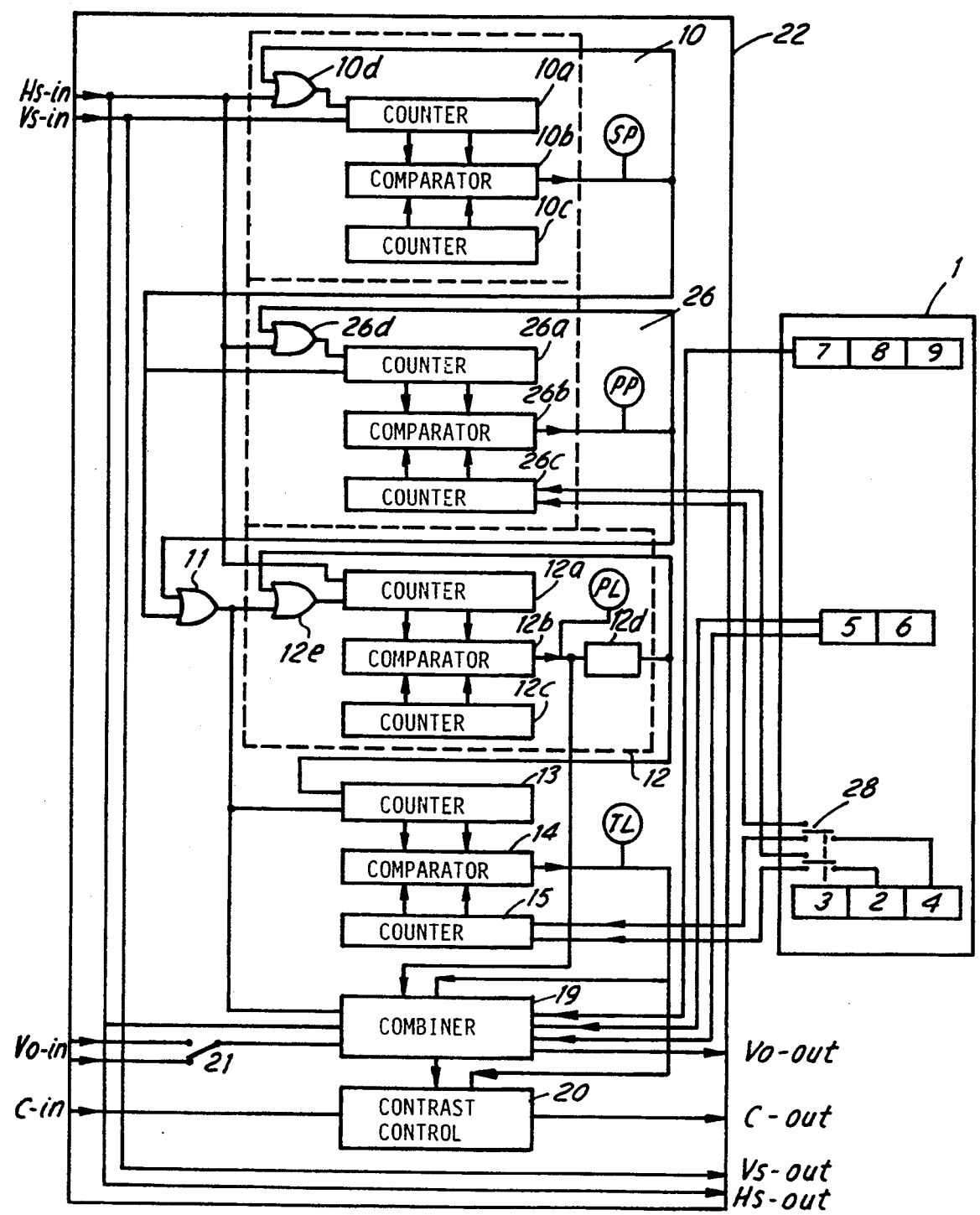
FIG. 4 shows a more detailed circuit diagram of the second embodiment of the invention.

Blocks 10,12,13 and 15 are analogous to the counters 10,12,13 and 15 in the first embodiment. The circuit diagram of the second embodiment of the invention is shown in more detail in FIG. 4. This figure shows the keyboard 1 with its keys 2–9 and the interface unit 22. The blocks of circuitry corresponding to blocks 10,26 and 12 in FIG. 3 are clearly shown.

The inputs and outputs of the interface circuit are the same as those in the first embodiment. The Hs-in inputs and the Vs-in signal are coupled directly to the Hs-out and Vs-out outputs.

The start/top of screen position block 10 comprises an OR gate 10d with one of its inputs coupled to the Hs-in input and the other input coupled to the start position SP output of a comparator 10b. The output of gate 10d is coupled to the clock input of a counter 10a the output of which is coupled to one of the inputs to the comparator 10b. The other input of comparator 10b is coupled to a presettable top of screen start position counter or switch 10c. A reset input on counter 10a is coupled to the Vs-in input. The start signal output of the comparator 10b is the output of block 10 and is coupled to one of the inputs to OR gate 11 and also to a reset input of counter 26a in the line pixel position adjustment block 26.

In block 26 an OR gate 26d has one of its inputs coupled to the Hs-in input and the other to the output of a comparator 26b which is the pixel position signal (PP).

The output of gate 26d is coupled to the clock input of counter 26a and the output counter 26a is coupled to one of the inputs to the comparator 26b. The other input to comparator 26b is coupled to a counter 26c which has up and down inputs coupled to the up/down keys 2,4 on the keyboard 1 when pixel (slow) mode is selected with key 3.

The pixel position PP output of comparator 26b is coupled to the other input of gate 11 the output of which is coupled to an input of an OR gate 13e in the text line position block 12. The other input to this gate 12e is coupled to the output of an edge detection circuit 12d and the output of the gate 12e is coupled to the reset input of a counter 12a. The clock input of this counter or switch 12a is coupled to the Hs-in input and its output is coupled to one of the inputs to a comparator 12b. The other input to comparator 12c is coupled to the output of a presettable counter 12c. The pixel line PL output of comparator 12b is coupled to the input of the edge detection circuit 12d and also to an input of a line and video combiner circuit 19.

The output of the edge detection circuit 12d is also coupled to the clock input of a counter 13 which counts steps corresponding to character cell blocks. The reset input of this step counter is coupled to the output of gate 11 which is also coupled to an input to the combiner 19. The output of the step counter 13 is coupled to one of the inputs of a comparator 14, the other input being coupled to the output of a counter 15. Counter 15 has its up and down inputs coupled to the outputs of keys 2 and 4 when key 3 is in the block step (fast) mode position. The text line TL output of comparator 14 is coupled to an input of the combiner 19.

The combiner 19 has further inputs coupled to the Vo-in input via switch 21 (as in the first embodiment), to the thick/thin line key 5 and the line on/off key 6, and to the R,G and B outputs generated by keys 7,8 and 9. The combiner has two outputs one coupled to the Vo-out output of the interface unit 22 and the other to an input of a contrast control circuit 20.

Another input of the contrast control circuit 20 is coupled to the C-in input and its output is coupled to the C-out output.

The fast/slow (step/pixel) key on the keyboard operates a switch 28 which switches the outputs of the up-/down keys 2,4 between the up/down inputs of counter 26c and the up/down inputs of counter 15.

In operation, the vertical sync signal is used to reset the datum position timer or counter 10a. When the vertical sync signal changes state the datum counter 10a starts counting until the number of H sync pulses match the preset datum position in counter 10c. The output from the comparator 10b then stops the datum counter 10a and enables the pixel counter 26a and the pixel line counter 12a with the SP signal.

The pixel counter 26a counts once for every H sync pulse until it matches the pixel position counter 26c. The comparator 26B then stops the pixel counter 26a and starts the character cell block counter 12a with the signal PP via gate 11. The pixel position counter 26c is controlled by the up/down keys 2,4 and an associated pulse generator circuit (not shown) which supplies pulses to the up/down counters 15, 26c and by pixel/-block step mode select key 3 which routes the up/down key pulses to pixel position counter 26a or block step position counter 15 respectively.

The character cell block counter 12a counts until it matches the preset pixel character cell block size e.g 14 pixels, in 12c. The PL signal from the comparator 12b and edge detection circuit 12d then resets the counter 12a and supplies one count signal to the step counter 13, thus incrementing counter 13 once for every line of text.

The step counter 13 counts until it matches the output of the step position counter 15. The step comparator 14 then turns on the text line signal.

The text line signal is combined with the top of screen blanking, edge of screen blanking signals, thin underline signal derived from comparator 12b and thick/thin line key switch 5 select signal and line on/off key 6 signal in the combiner 19 to produce a line marker signal therein.

Combiner 19 combines the line colour select key signals 7,8,9 under the control of the line marker signal from 14 with the video signal Vo-in and if a video signal is present also increases the intensity/contrast control signal Co in the video intensity/contrast control circuit 20, thus highlighting the displayed information covered by the marker line by controlling the intensity/contrast control(s) of the VDU with the signal from control circuit 20. Logic gates 10d, 26d 12e are used to control the counters respectively. Logic gate 11 is used to "OR" the outputs from comparators 10b and 26b to inhibit counter 12a until the pixel counter is finished.

Optional switch 21 which may be controlled either under hardware or software is used to switch between different video signals e.g monochrome or colour.

Figure 5:
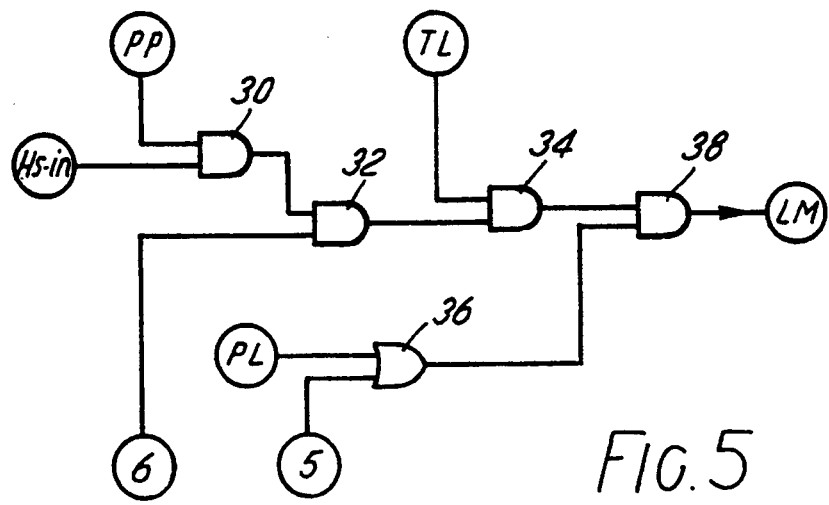
FIG. 5 shows a first portion of a video line combiner circuit for generating a line marker signal from a pixel position signal, a text line position signal, a thick/thin line signal, and a line on/off signal.
Figure 6:
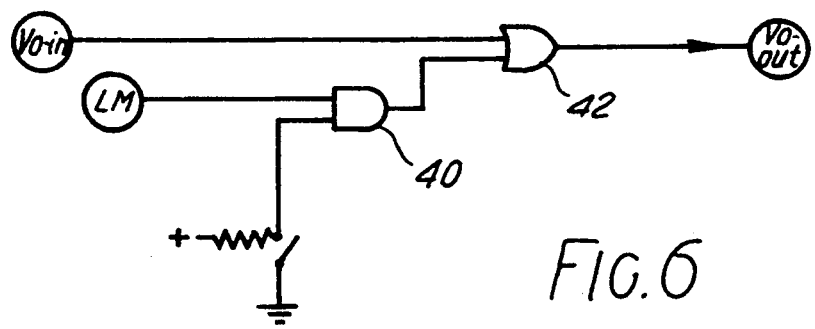
FIG. 6 shows a second portion of the video/line combiner circuit for combining the line marker signal and a first line colour signal with a video signal.

The line and video combiner circuit 19 consists of two parts which are shown in FIGS. 5 and 6 respectively.

The first part is shown in FIG. 5 and has inputs from the HS-in sync signal, the pixel position signal pp, the text line signal TL, the pixel line signal PL, the line on/off key 6 and the thick/thin line key 5. Hs-in and PP form the inputs to an AND gate 30 which controls the start position of a line on the screen. Hs controls the length of line and turns the line off during the flyback period of the VDU. The output of gate 30 is coupled to an input of an AND gate 32 the other input of which receives the line on/off signal from key 6. The output of gate 32 is coupled to one of the inputs to an AND gate 34 which controls the row of text covered by the line marker. The PL signal and the thick/thin line signal from key 5 form the inputs of an OR gate 36. The output of gates 34 and 36 are the inputs to an AND gate 38 the output of which is the line marker signal LM.

The second part of the combiner circuit 17 comprises three similar blocks one of which is shown in FIG. 6. The block has inputs from Vo-in the LM signal, and one of the R,G and B colour signals from keys 7,8 and 9, one of R,G and B signals going to each of the three blocks.

The LM signal and the colour signal form the inputs to an AND gate 40, the output of which is coupled to an input to an OR gate 42. The other input to this OR gate is the Vo-in signal and the output is the Vo-out combined line and video signal. The three blocks are connected in series to combine each of the R,G and B signals with the video signals.

An optional exclusive OR gate may receive either the LM signal or the Vo-in signal the other input receiving a key signal to selectively invert the output Vo-out.

Figure 7:
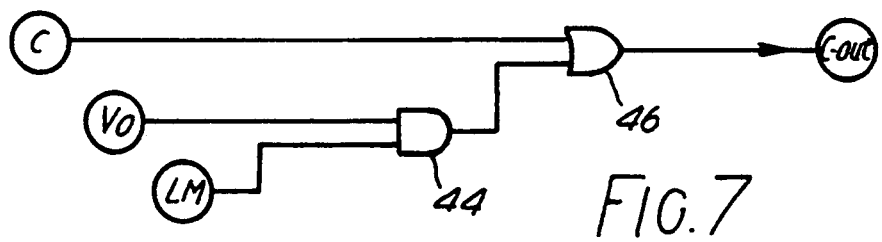
FIG. 7 shows a contrast control circuit.

The contrast control circuit shown in FIG. 7 receives inputs from the C-in signal, the LM signal and the Vo-in signal. The VO-in signal, the LM signal form the inputs to an AND gate 44 and the output of this is coupled to the input of an OR gate 46. The other input of gate 46 receives the C-in signal and the output is the C-out signal which controls the contrast control or the intensity control or both contrast and intensity controls on the VDU to highlight the text covered by the line marker.

Three basic standards of video/contrast signals are used in computers and terminals. So that the line does not obliterate the displayed information the line marker contrast control circuit is connected as below.

1. Monochrome—video signal with contrast signal
2. Colour—RGB video signal with 3 individual contrast signals
3. Colour—RGB video signals with 1 contrast signal as used by IBM PC in their colour graphics card. For colour with a single contrast control the 3 Red, Green, Blue video signals are ORed before going to 44 as the Vo signal.

This invention produces a thick line emulating using a marker pen and a thin line emulating underlining. With a colour display the line colour can be selected from the keyboard which can also produce a black line which has the effect of highlighting the text or displayed information. In monochrome, only one colour can be shown together with a black line which again highlights the text or displayed information. In fact only contrast and/or intensity need to be changed for monochrome operation. The line may be scrolled over the displayed information or alternatively the line may be left in a set position and the displayed information scrolled. The invention works with any computer or terminal with the appropriate adaptor and is totatlly independent of any software being used.

The VDU line marker electronic interface card/unit 22 has been described with TTLI (monochrome +contrast) and RGBI (colour +contrast) video signal comparability. The electronic interface card/unit can easily be adapted to work with any other standards of VDU signals or video signals e.g. TTL, RGB, RGB/TTL, XRGB, RGB-Synch, RGB-Linear, Composite Video, MDA, CGA, EGA, VGA, MCGA, PAL, NTSC, SECAM etc and the new digital and analogue standards when introduced with the appropriate decoder/coder and with any display technology e.g. CRT, liquid crystal, plasma, electroluminescent etc.

The line marker described operates by controlling the line position and thickness with four digital counters. These counters are synchronized with the horizontal and vertical sync pulses and thus no further timing circuitry is needed. Separate keys are provided for controlling the line thus avoiding the need to use any of the keys on the main keyboard. The line is generated by hardware rather than software and no additional processor or memory areas are needed to implement it. Thus the line may be displayed at any time.

The system described enables a user to select to move in steps of character block or blocks so that, for example, a display with a vertical resolution of 350 pixels and a character cell block depth of 14 pixels giving 25 line blocks, now only requires the marker line to move 25 steps (25 character cell blocks) to traverse from top to bottom of the screen taking Just over 2 seconds (25 line blocks/12 steps) instead of nearly half a minute moving a pixel at a time (350 pixels/12 steps). The marker line thickness can be adjusted to suit any cell block width or depth or can be increased to cover a number of character blocks so that the marker line can move complete columns or sections at a time.

To be able to position the line where the displayed information does not exactly coincide with the standard character cell block or start at the normal datum, or for software programmes e.g CAD. graphs, desktop publishing etc. that display information at any pixel position on the screen, a second mode of line movement is incorporated which enables the marker line to be adjusted pixel by pixel anywhere within the selected cell block or blocks.

By fitting the pixel position circuit first, followed by the character cell block(s) position circuit, fast accurate, simple positioning of the marker line is achieved together with the advantage of being able to select a pixel position anywhere on the screen or offset the cell blocks when the cell blocks do not start at the recognised datum position.

The settings for the datum position, pixel block and character cell block which may be the same or different, are normally situated on the line marker card but alternatively, together or separately, with the line colour selection, line thickness, line on/off, line positioning and pixel or cell block(s). Step selection may be controlled with a suitable interface by the computer or terminal, keyboard, touch screen, mouse, lightpen or under software control etc.

The marker line, in addition to highlighting the displayed information, may be interfaced to the computer so that the displayed information may be acted upon, printed out, networked, faxed, telexed etc.

A vertical Y axis marker can be produced on the same basic principles as the X axis line marker described above, except that the counters need to be clocked by an oscillator synchronised with the pixel scan frequency.

Two or more lines can be displayed simultaneously, either in the same axis or different axes. The line marker systems are duplicated and may have either 2 sets of keys or a changeover key. The outputs of the video and contrast signals are combined prior to leaving the card (22) for the display (23). When the video and line signals are combined on a colour display the line will change the colour of any information it covers to a composite colour e.g red line and blue text will produce magenta text.

An infinite colour range can be obtained with an analogue signal and using a potentiometer control(s) instead of keys. The basic design with a colour display produces 8 line colours. The line colours may be extended by controlling the contrast signals with additional keys on the keyboard.

Pixel position adjustment may be used to also traverse the screen pixel by pixel.

The (LM) signal may also be used like a light pen or mouse to command software action e.g alter a menu, print a line, confirm a decision etcc. The LM signal may be used with a key for this purpose.

The line marker may be interfaced with overhead projectors that are connected to VDU computer or similar displays.

The circuits described herein are digital circuits but they may also be implemented in analogue form or alternatively in a microprocessor controlled design.

We claim:

1. Apparatus for electronically generating a movable marker for a line on a video display unit (VDU) associated with a computer having a central processing unit (CPU), said apparatus being completely independent of the CPU and connectable in series between a computer video output and an associated video display unit, said apparatus comprising circuit means having input means for coupling to the computer video output to receive a first video signal therefrom and output means for coupling to the visual display unit, the circuit means comprising detecting means responsive to synchronising information in the video signal for detecting a desired datum position in the video signal, means for indicating the desired position in the video signal at which a marker is to be inserted in accordance with a control input, counting means coupled to the detecting means for providing a signal representing a scanning position in the video signal relative to the datum position and means for generating the marker in an output video signal at the output means when the scanning position represented by the signal from the counting means reaches the desired position as determined by the indicating means.

2. Apparatus according to claim 1 including a source of second video signals (7,8,9) and wherein the means for generating the marker comprises means (19) for combining the first and second video signals when the scanning position reaches the desired position.

3. Apparatus according to claim 2 in which the source of second video signals comprises at least one source of colour signals.

4. Apparatus according to claim 3 in which there are three selectable sources of colour signals.

5. Apparatus according to claim 1 in which the means for generating the marker includes means responsive to the indicating means for providing a signal to control the contrast of the VDU display of the output video signal in the desired position.

6. Apparatus according to claim 1 in which the marker generating means includes means responsive to the indicating means for providing a signal to control the intensity of the VDU display of the output video signal in the desired position.

7. Apparatus according to claim 1 further including manually operable means for providing control signals to alter the desired position of the marker in the first video signal.

8. Apparatus according to claim 1 further including means for selectively switching the marker generating means between on and off conditions, thereby selectively generating the marker.

9. Apparatus according to claim 1 further including means for switching the marker generating means between a first mode in which the marker is movable in a vertical direction and a second mode in which the marker is movable in a horizontal direction.

10. A method for electronically generating, completely independently of a computer central processing unit (CPU), a movable marker for a line on a visual display unit (VDU) associated with a computer in which the method generates and positions the line marker in the video signal by the steps of receiving an output video signal from a computer video output, detecting a datum position in the video signal from its associated synchronising information, counting to produce a signal representing a scanning position in the video signal relative to the datum position, providing a signal indicating a desired position in the video signal at which a marker is to be inserted in accordance with a control input, generating the marker and inserting it in the video signal when the scanning position in the video signal reaches the desired position, and applying the thus-modified signal to an associated VDU.

11. A method according to claim 10 in which the step of generating the marker comprises providing a second video signal and combining the first and second video signals.

12. A method according to claim 10 in which the step of generating the marker comprises increasing the contrast of the VDU display of the output.

13. The method according to claim 10 further including the step of increasing the intensity of the VDU display in the vicinity of the marker.

14. Apparatus for electronically generating a movable marker for a line on a video display unit (VDU) associated with a computer having a central processing unit (CPU), said apparatus being completely independent of the CPU and connectable in series between a computer video output and an associated video display unit, said apparatus comprising:
   input means which is connectable to a computer video output for receiving a video signal therefrom which contains synchronizing information for controlling the VDU;
   detecting means coupled to the input means and responsive to said synchronizing information for detecting a desired datum position in the video signal;
   a control circuit for generating a selected marker signal and selectively positioning the marker signal in said video signal relative to said desired datum position, thereby developing a modified video signal for presentation to a VDU; and
   output means which is connectable to an associated VDU for applying said modified video signal thereto.

* * * * *

UNITED STATES PATENT AND TRADEMARK OFFICE
CERTIFICATE OF CORRECTION

PATENT NO. : 5,339,094
DATED : August 16, 1994
INVENTOR(S) : Murrell, et al.

It is certified that error appears in the above-indentified patent and that said Letters Patent is hereby corrected as shown below:

On the title page, item [63] and [30], should read as follow:

[63] Continuation of Ser. No. 460,883, Mar. 5, 1990, abandoned, which was filed from PCT/GB 88/00664, Aug, 11, 1988.

[30] Foreign Application Priority Data

Aug. 11, 1987 [GB] Great Britain ..........87 18925
    Mar. 15, 1988 [GB] Great Britain ..........88 06168

Signed and Sealed this

Thirty-first Day of October 1995

Attest:

BRUCE LEHMAN

Attesting Officer      Commissioner of Patents and Trademarks